United States Patent
Onac et al.

(10) Patent No.: US 9,791,131 B2
(45) Date of Patent: Oct. 17, 2017

(54) LIGHTING ELEMENT, A LIGHTING SYSTEM AND A LUMINAIRE PROVIDING A SKYLIGHT APPEARANCE

(75) Inventors: Gabriel-Eugen Onac, Veldhoven (NL); Ramon Antoine Wiro Clout, Eindhoven (NL); Bart Andre Salters, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/233,530

(22) PCT Filed: Jul. 9, 2012

(86) PCT No.: PCT/IB2012/053496
§ 371 (c)(1),
(2), (4) Date: Jan. 17, 2014

(87) PCT Pub. No.: WO2013/011410
PCT Pub. Date: Jan. 24, 2013

(65) Prior Publication Data
US 2014/0321113 A1    Oct. 30, 2014

(30) Foreign Application Priority Data

Jul. 20, 2011   (EP) .................................... 11174687

(51) Int. Cl.
*F21V 13/04* (2006.01)
*F21V 5/00* (2015.01)
(Continued)

(52) U.S. Cl.
CPC .............. *F21V 13/04* (2013.01); *F21V 5/007* (2013.01); *F21V 5/045* (2013.01); *F21V 9/16* (2013.01);
(Continued)

(58) Field of Classification Search
CPC .......... F21V 13/04; F21V 5/045; F21V 5/007; F21V 9/16; F21V 7/22; F21V 9/169;
(Continued)

(56) References Cited

U.S. PATENT DOCUMENTS

2004/0264201 A1 * 12/2004 Wisler ......................... 362/343
2006/0245194 A1 * 11/2006 Kikuchi et al. ............... 362/257
(Continued)

FOREIGN PATENT DOCUMENTS

EP   1033530 A2   9/2000
FR   2954458 A1   6/2011
(Continued)

*Primary Examiner* — David V Bruce

(57) ABSTRACT

A lighting element 100, a lighting system and a luminaire are provided. The lighting element 100 is used for obtaining a skylight appearance and has a white light emitting means 104 for emitting white light, a blue light emitting means 106 for emitting blue light and a Fresnel lens 102. The Fresnel lens 102 is arranged to receive light from the white light emitting means 104 and from the blue light emitting means 106. The white light emitting means 104 is arranged in a first relative position with respect to the Fresnel lens 102 to collimate at least a part of the light emitted by the white light emitting means 104 to obtain a collimated directed light beam in a specific direction. The blue light emitting means 106 is arranged in a second relative position with respect to the Fresnel lens 102 to obtain a blue light emission at least outside the collimated directed light beam.

8 Claims, 8 Drawing Sheets

(51) Int. Cl.
*F21V 5/04* (2006.01)
*F21V 9/16* (2006.01)
*F21V 8/00* (2006.01)
*F21S 8/04* (2006.01)
*F21V 7/22* (2006.01)
*F21W 121/00* (2006.01)
*F21Y 105/00* (2016.01)
*F21Y 105/10* (2016.01)
*F21Y 115/10* (2016.01)
*F21Y 113/10* (2016.01)
*F21Y 113/13* (2016.01)

(52) U.S. Cl.
CPC ......... *G02B 6/0036* (2013.01); *G02B 6/0068* (2013.01); *G02B 6/0073* (2013.01); *F21S 8/04* (2013.01); *F21V 7/22* (2013.01); *F21W 2121/00* (2013.01); *F21Y 2105/00* (2013.01); *F21Y 2105/10* (2016.08); *F21Y 2113/10* (2016.08); *F21Y 2113/13* (2016.08); *F21Y 2115/10* (2016.08)

(58) Field of Classification Search
CPC .. G02B 6/0073; G02B 6/0036; G02B 6/0068; F21S 8/04; F21W 2121/00; F21Y 2101/02; F21Y 2105/00; F21Y 2105/001; F21Y 2113/002; F21Y 2113/005
USPC ......................................................... 362/231
See application file for complete search history.

(56) References Cited

U.S. PATENT DOCUMENTS

| | | | |
|---|---|---|---|
| 2008/0157009 A1* | 7/2008 | Wittenberg | G02B 6/0055 250/494.1 |
| 2008/0273323 A1* | 11/2008 | Ladstaetter | 362/231 |
| 2010/0046217 A1* | 2/2010 | Ngai | 362/235 |
| 2011/0194270 A1* | 8/2011 | Di Trapani et al. | 362/2 |
| 2012/0320626 A1* | 12/2012 | Quilici et al. | 362/606 |

FOREIGN PATENT DOCUMENTS

| | | |
|---|---|---|
| JP | 2008021561 A | 1/2008 |
| JP | 2010238407 A | 10/2010 |
| WO | 2009087587 A1 | 7/2009 |
| WO | 2009156347 A1 | 12/2009 |
| WO | 2011033413 A1 | 3/2011 |

* cited by examiner

LIGHTING ELEMENT, A LIGHTING SYSTEM AND A LUMINAIRE PROVIDING A SKYLIGHT APPEARANCE

FIELD OF THE INVENTION

The invention relates to optical elements which are used to create a skylight appearance.

BACKGROUND OF THE INVENTION

Published patent application US2008/0273323A1 discloses a specific luminaire design to emit light which is experienced by users as pleasant. The luminaire comprises a main light source and an additional light source. The additional light source emits light having a color distribution that is different from the color distribution of the main light source. Light of the main light source and of the additional light source are mixed before being emitted through the main light exit window of the luminaire. Further, a portion of the light emitted by the additional light source is guided to a side or a rear side of the luminaire in order to be emitted through an additional light exit window on said side or said rear side of the luminaire. Such a luminaire provides an opportunity to emit white light through the main light exit window and also to emit light of a different color, for example, blue light via the additional light exit window. To some extent, this provides a skylight appearance because white light and, possibly, blue light are emitted. However, if a viewer looks towards the luminaire, irrespective of the viewing angle, the luminaire is perceived as a white light emitting luminaire and the area around it (the roof or the wall) is perceived as a blue light reflective area. A skylight in a roof provides, on sunny days, a directed light beam of sunlight, and blue light in other directions. Thus, the viewer who looks towards the skylight and who is inside the directed light beam of sunlight, sees a white skylight, while viewers outside the directed light beam see a blue skylight. In other words, the luminaire of the cited patent application provides a limited skylight experience.

Further, the luminaire according to the cited patent application has a complicated structure and requires a relatively large number of optical elements, such as, at least two light sources which each emit light having a different color distribution, a means to mix the light of both light sources, and a light guiding structure to guide light of the additional light source towards the additional light exit window. Thus, the known luminaire for creating an attractive light emission is relatively expensive.

SUMMARY OF THE INVENTION

It is an object of the invention to provide a more cost-effective optical element for creating a skylight appearance.

A first aspect of the invention provides a lighting element as claimed in claim 1. A second aspect of the invention provides a lighting system as claimed in claim 10. A third aspect of the invention provides a luminaire as claimed in claim 11. Advantageous embodiments are defined in the dependent claims.

A lighting element for obtaining a skylight appearance in accordance with the first aspect of the invention comprises a white light emitting means for emitting white light, a blue light emitting means for emitting blue light and a Fresnel lens. The Fresnel lens is arranged to receive light from the white light emitting means and from the blue light emitting means. The white light emitting means is arranged in a first relative position with respect to the Fresnel lens to collimate at least a part of the light emitted by the white light emitting means to obtain a collimated directed light beam in a specific direction. The blue light emitting means is arranged in a second relative position with respect to the Fresnel lens to obtain a blue light emission at least outside the collimated directed light beam.

The lighting element according to the invention uses the Fresnel lens to collimate the light from the white light emitting means into a collimated directed light beam comprising white light. The central axis of the collimated directed light beam has a specific angle with respect to the normal to the Fresnel lens and the direction of the central axis is the specific direction. The relative position of the blue light emitting means with respect to the Fresnel lens is such that blue light is emitted in a plurality of light emission directions and the light emission directions are such that at least a part of the blue light is emitted outside the collimated directed light beam.

The collimated directed light beam emitted by the lighting element is perceived by a viewer as direct sunlight which falls through a skylight or a window on a sunny day. If the viewer looks towards the lighting element from a position outside the collimated directed light beam, he does not see the white light of the collimated directed light beam and he may see the blue light, which is comparable to the blue sky that a person sees when he looks through a skylight from a position outside the beam of direct sunlight. Thus, the lighting element provides a skylight appearance which is experienced by users as pleasant lighting of an inner space of a building. When direct daylight, or artificial daylight emitted by the lighting element of the invention, illuminates a room, the well-being of the people in the room is positively influenced, and, for example, the productivity of the people may increase.

The lighting element according to the invention does not have a complex structure and uses a limited number of components and therefore is relatively cheap to manufacture. Further, Fresnel lenses are relatively thin, and by using a Fresnel lens with a relative short focal distance, the distance between the light emitting means and the Fresnel lens may be relatively short. Consequently, the dimensions of the lighting element may be small. Because of the cost advantage and the relatively small size, relatively large panels comprising a plurality of lighting systems may be manufactured at relatively low cost. The size of the relatively large panels may be comparable to the size of windows or skylights, which provides an even better skylight or daylight perception to people in a room provided with such relatively large panels.

The white light emitting means emits white light, more in particular, light that is similar to white light. This means that the wavelength distribution of the white light is such that a color point of the white light is a color point on or close to a black body line of the color space. The human naked eye perceives light with a color point on the black body line as being in the range of cool-white to warm-white light. Direct sunlight is also white light and has a color point close to or on the blackbody line of the color space. Direct sunlight also varies, depending on the time of day and atmospheric conditions, between cool-white and warm-white. It is to be noted that this does not mean that the wavelength distribution is exactly the same as the wavelength distribution of direct sunlight. The light emitted by the white light emitting means may, for example, be a combination of some primary colors which, in said combination, result in a color point in the color space that is close to, or on, the black body line.

The blue light has a spectral distribution in which wavelengths in the blue spectral range are dominant with respect to wavelengths outside the blue spectral range such that the human naked eye experiences the light as light of a blue color. Optionally, the blue light emission is in a plurality of light emission directions and at least a part of these light emission directions is outside the collimated directed light beam.

The collimated directed light beam is collimated, which means that the light emission angles of the light rays in the light beam have only a relatively small angle with respect to the central axis of the collimated directed light beam such that the size of the cross-section of the collimated directed light beam only slightly widens with increasing distances from the Fresnel lens. Optionally, all light rays of the collimated directed light beam are parallel to each other.

The specific direction is a direction away from the Fresnel lens, following the central axis of the collimated directed light beam and extending at a specific angle to the normal of the Fresnel lens. Optionally, the specific direction includes an angle of substantially zero degrees with the normal to the Fresnel lens.

Optionally, the first relative position of the white light emitting means is close to the focal plane or in the focal plane of the Fresnel lens. If the white light emitting means is located in the focal plane of the Fresnel lens, the emitted light is collimated in a light beam, wherein all light rays are parallel and thus are all emitted in the specific direction. If the white light emitting means is located near the focal plane, not all light rays in the collimated directed beam follow parallel paths, but their light emission directions include only a minimal angle with a central axis of the light beam. The central axis is an imaginary line through a central point of the white light emitting means and a central point of the Fresnel lens.

Optionally, the blue light emitting means comprises a plurality of blue light emitters arranged in the focal plane of the Fresnel lens. If the blue light emitting means comprises light emitters arranged in the focal plane of the Fresnel lens, the light of these light emitters is also collimated, but because there is a plurality of blue light emitters in this plane, the blue light is emitted in a plurality of directions (different from the specific direction), which consequently results in blue light emission outside the collimated directed light beam. Because more than one blue light beam is emitted, this may be perceived by viewers as more diffuse blue light. Note that the first relative position is different from the second relative position. Such an arrangement of the blue light emitting means is relatively cost-effective because, if all light emitters may be arranged in the same plane, all light emitters may be coupled to a flat, relatively cheap, substrate.

Optionally, the blue light emitting means comprises at least one blue light emitter arranged outside the focal plane of the Fresnel lens. If a light emitter is not arranged in the focal plane, the emitted light of this blue light emitter is not collimated to the same extent as the white light and consequently blue light is emitted outside the collimated directed light beam. The more the blue light emitter is out of focus, the wider the beam of the blue light emission will be, which, subsequently, results in the fact that viewers perceive the blue light as more diffuse light. Note that the first relative position is different from the second relative position. Such an arrangement of the blue light emitting means is relatively cost-effective; by using only a single blue light source a sort of diffuse blue light emission may be obtained.

Optionally, the white light emitting means comprises a light source which emits white light. The white light emitting means requires no additional light conversion means because the light source immediately emits the required color of light, which is advantageous with respect to costs. As discussed before, white light is light perceived as white light by the human naked eye and it has a color point on or near the black body line in the color space.

Optionally, the white light emitting means comprises a combination of light reflection material and luminescent material to obtain a light emission that has a spectral distribution of white light. The light reflection material is arranged to reflect light of a specific spectral distribution. The luminescent material is configured to absorb a part of the light of the specific spectral distribution and convert the absorbed part towards light of another spectral distribution. If the white light emitting means comprises light reflection material and luminescent material, the lighting element may use a relatively cheap light source for emitting light of the specific spectral distribution and the luminescent material is used to convert a part of this light to light of another spectral distribution to obtain white light. This may be cheaper in specific configurations; the lighting element may, for example, share a blue light emitter between the blue light emitting means and the white light emitting means.

Optionally, the blue light emitting means comprises a light source which emits blue light. The blue light emitting means according to this optional arrangement requires no additional light conversion means because the light source immediately emits the required color of light, which is advantageous with respect to costs.

Optionally, the blue light emitting means comprises a light reflective material which is reflective in a predefined spectral range to obtain a blue light emission. A light reflective material is, for example, blue paint, which is a very cost-effective means to generate the blue light emission. This optional arrangement provides, for example, the possibility to share a light source which emits white light between the white light emitting means and the blue light emitting means.

Optionally, the blue light emitting means comprises a first light guide which comprises a first light input window and a first light output window. The first light input window is arranged in a position where it captures light from the white light emitting means that is not directly emitted towards the Fresnel lens. The first light guide comprises first outcoupling structures to outcouple light via the first light output window. The first light output window is arranged to emit outcoupled light towards the Fresnel lens. The first light guide is light transmissive in a predefined spectral range to obtain a blue light emission through the first light output window or the first outcoupling structures are light reflective in a predefined spectral range to obtain the blue light emission.

Often, in a practical configuration, not all light of the white light emitting means is directly emitted towards the Fresnel lens and the first light guide captures this light. Subsequently, the light guide guides the captured light towards the first outcoupling structures. The first outcoupling structures have the function of redirecting the captured light towards the first light output window and, thus, towards the Fresnel lens. Because the lightguide itself is transmissive in the blue spectral range or the outcoupling structures are blue reflective, the outcoupled light is blue. The specific arrangement of this option is cost-effective because no additional blue light emitters are required, and the light which is not directly emitted towards the Fresnel lens is advantageously used and cannot contribute to undesired light effects.

Optionally, the lighting element comprises a blue light source emitting blue light, and a second light guide. The second light guide comprises a second light input window and a second light output window. The second light input window is arranged to receive light from the blue light source. The second light output window is arranged to emit outcoupled light towards the Fresnel lens. The second light guide comprises a luminescent outcoupling structure to outcouple white light via the second light output window. The luminescent outcoupling structure comprises a combination of a light reflective material and a luminescent material to obtain a light emission that has the spectral distribution of white light. The light reflection material is configured to reflect blue light. The luminescent material is configured to absorb a part of the blue light and to convert a part of the absorbed light towards light of another specific spectral distribution. The second light guide further comprises blue light outcoupling structures arranged to outcouple the blue light via the second light exit window.

In the above discussed optional arrangement, one light guide is shared by the white light emitting means and the blue light emitting means. The white light emitting means is a combination of the blue light source, the second light guide and the luminescent outcoupling structure. The relative position of the luminescent outcoupling structure with respect to the Fresnel lens determines the specific direction of the collimated directed light beam. This relative position is also such that a collimated light beam is obtained, which means that, taking into account the refraction of light at the interface between the light guide and the medium around the light guide, the luminescent outcoupling structure is located in or close to an imaginary focal plane of the Fresnel lens. The imaginary focal plane is the plane within the light guide which corresponds to the focal plane of the Fresnel lens after correction of the position of the focal plane for refraction at the interface between the light guide and the medium around the light guide.

It is to be noted that the luminescent outcoupling structure has a first relative position with respect to the Fresnel lens such that a directed collimated light beam is obtained. Because light emitted by the luminescent outcoupling structures is refracted at the interface between the second light guide and the environment of the second light guide, the first relative position is not close to or on the focal plane of the Fresnel lens, but close to or on a virtual focal plane within the second light guide. The virtual focal plane is a focal plane that is corrected for the refraction of light at the interface between the second light guide and the environment of the second light guide. Thus, if within the light guide light is emitted from a point on the virtual focal plane towards the Fresnel lens, the Fresnel lens refracts the light such that a parallel beam of light is obtained. The blue light emitting means is the combination of the blue light source, the second light guide and the blue light outcoupling structures.

The above-discussed optional arrangement may comprise only one light source and the light guide is used to distribute the light to different locations at which the respective outcoupling structures are present. Thus, the arrangement allows a cost-effective construction of a lighting element. Further, the light source may be attached to a printed circuit board and the size of this printed circuit board may be small, while in other options of the invention the printed circuit board needs to have a size that is comparable to the size of the light guide of the option of the invention.

Optionally, the lighting element comprises a light transmitting channel and a white light source. The light transmitting channel has walls facing the interior of the channels and the walls are light reflective in a predefined spectral range to obtain a blue light emission. The white light source emits white light and is arranged in the light transmitting channel. The combination of the white light source and the light transmitting channel is arranged to emit a partly collimated white light beam and a diffuse blue light towards the Fresnel lens.

The light transmitting channel pre-collimates the light of the white light source and has as additional function the creation of a blue light emission outside the pre-collimated white light beam. The Fresnel lens further collimates the white light and because the blue light is emitted outside the pre-collimated white light beam, the blue light emission will also be outside the collimated directed light beam after having propagated beyond the Fresnel lens. The arrangement uses only one light source for generating light and uses a relatively simple structure of a channel with blue walls to generate the blue light. This is a cost-effective lighting element for obtaining the skylight appearance.

According to a second aspect of the invention, a lighting system is provided which comprises a plurality of lighting elements according to the first aspect of the invention. The specific direction of the directed collimated light beam of each lighting element is equal to a predefined direction. In other words, the central axes of each one of the collimated light beams are parallel to each other such that a combined large collimated light beam is created. Further, the blue light of each one of the lighting elements is emitted outside the individual collimated light beams and therefore they create one combined blue light emission outside the combined large collimated light beam. It is to be noted that the blue light emissions of each one of the lighting elements may be different such that the combined blue light emission is perceived by persons as a more diffuse blue light emission; however, the blue light emission of each one of the lighting elements may also be similar to each other. Thus, because the lighting elements are cost-effective means to create a light emission having a skylight appearance, a cost-effective lighting system may be manufactured to create a skylight appearance along a larger surface which is comparable to a skylight in a roof or a window in a wall.

The lighting system according to the second aspect of the invention provides the same benefits as the lighting element according to the first aspect of the invention and has similar embodiments with similar effects as the corresponding embodiments of the lighting element.

It is to be noted that in the lighting system, the white light emitting means and the blue light emitting means may also emit some light to Fresnel lenses of other lighting elements, which results in cross-talk light emission by the lighting system. Specific embodiments of the lighting elements prevent this cross-talk between light emitting means and Fresnel lenses, for example, by means of the first light guide parts, or the light transmitting channels.

According to a third aspect of the invention, a luminaire is provided which comprises the lighting element according to the first aspect of the invention or the lighting system according to the second aspect of the invention.

The luminaire according to the third aspect of the invention provides the same benefits as the lighting element or the lighting system according to, respectively, the first or the second aspect of the invention and has similar embodiments with similar effects as the corresponding embodiments of the respective lighting element or the lighting system.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the system, the method, and/or of the computer program product, which correspond to the described modifications and variations of the system, can be carried out by a person skilled in the art on the basis of the present description.

Figure 1:
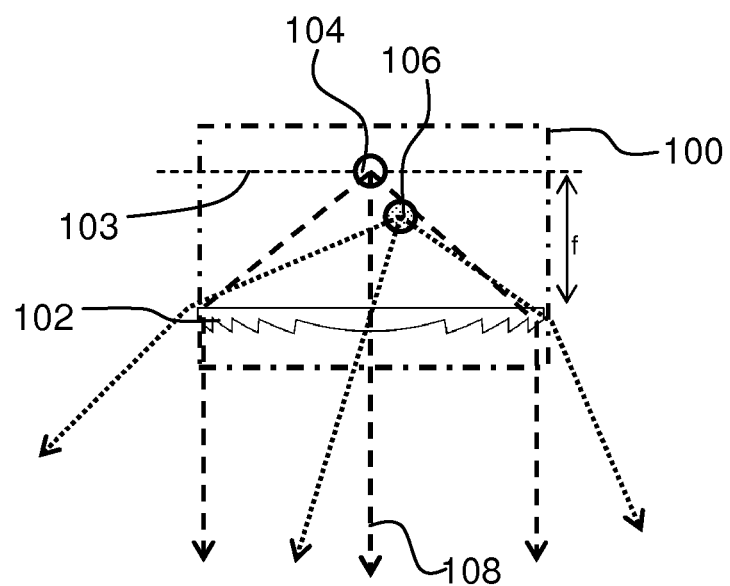
FIG. 1 schematically shows a cross-section of a lighting element according to the first aspect of the invention, FIG. 2 schematically shows a cross-section of another embodiment of the lighting elements, FIG. 3 schematically shows a cross-section of a further embodiment of the lighting element, FIG. 4 schematically shows a cross-section of a lighting system according to the second aspect of the invention, FIG. 5a schematically shows a cross-section of an embodiment of the lighting system comprising light guides, FIG. 5b schematically shows a 3D view of the embodiment of the lighting system of FIG. 5a, FIG. 6 schematically shows a cross-section of a further embodiment of the lighting system comprising a light guide, FIG. 7 schematically shows a cross-section of an embodiment of a lighting system comprising light transmitting channels, and FIG. 8 schematically shows a 3D view of a room which comprises a luminaire according to the fourth aspect of the invention.
Figure 1:
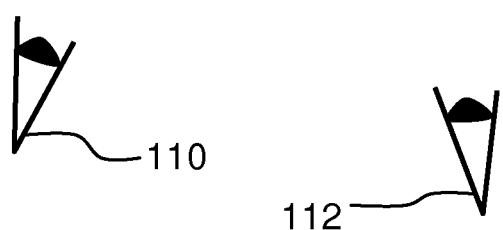

It should be noted that items denoted by the same reference numerals in different Figures have the same structural features and the same functions, or are the same signals. Where the function and/or structure of such an item have been explained, there is no necessity for repeated explanation thereof in the detailed description.

The figures are purely diagrammatic and not drawn to scale. Particularly for clarity, some dimensions are exaggerated strongly.

DETAILED DESCRIPTION

A first embodiment is shown in FIG. 1. The lighting element 100 comprises a Fresnel lens 102, a white light emitting means 104 and a blue light emitting means 106. White light is emitted by the white light emitting means 104 and rays of white light are schematically drawn with dashed lines. The blue light emitting means 106 emits blue light and rays of blue light are schematically drawn with dotted lines. The focal distance f of the Fresnel lens 102 and the focal plane 103 at the distance f are also indicated in FIG. 1.

The white light emitting means 104 is arranged in the focal plane 103 of the Fresnel lens 102, which means that the Fresnel lens collimates the light that is emitted by the white light source 104 into a collimated light beam in which all light rays have a light emission direction parallel to the direction of an imaginary central axis of the collimated light beam. The imaginary central axis is schematically indicated in FIG. 1 by means of the white light ray 108 which originates from a center of the white light emitting means 104 and which follows a path through a centerpoint of the Fresnel lens 102. The collimated light beam is a beam directed towards light ray 108. It is to be noted that the white light emitting means 104 may also be arranged close to the focal plane 103 such that the size of a cross-section of the collimated directed light beam of white light may slightly widen at larger distances from the Fresnel lens. However, compared to a light beam emitted by the white light emitting means, the collimated directed light beam comprises only light rays that have a light emission direction that forms a small angle with the imaginary central axis of the collimated directed light beam. The small angle is, for example, smaller than 15°.

The blue light emitting means 106 is arranged in a position relative to the Fresnel lens 102 such that the blue light emitting means 106 is not located in or close to the focal plane 103. Thus, a light beam of blue light that is emitted by the Fresnel lens is a relatively wide light beam and comprises at least light emission outside the collimated directed light beam.

In FIG. 1, a viewer 112 is schematically drawn and this viewer 112 is located inside the collimated directed light beam. The viewer 112 mainly sees the white light of the collimated directed light beam, especially if the intensity of the light emitted by the white light emitting means 104 is higher than the intensity of the light emitted by the blue light emitting means 106. The viewer 112 perceives the collimated directed light beam as direct sunlight. Another viewer 110 is schematically drawn in an area outside the collimated directed light beam. Said other viewer 110 does not see white light; he only sees blue light. Said other viewer 110 perceives the blue light outside the collimated directed light beam as the blue diffuse light which is also present in daylight on a sunny day. Thus, the lighting element 100 provides an effect that is comparable to a skylight appearance. If a skylight is present in a roof of a room and if it is a sunny day, a directed white light beams falls into the room and outside this beam the blue diffuse daylight falls into the room.

It is to be noted that the white light has a color point that is close to the blackbody line in a color space. This means that the human naked eye perceives the light as white light. It is not necessary that the light has exactly the same spectral distribution as daylight as long as the human naked eye perceives the color of the light as the color of daylight.

It is to be noted that, if the white light emitting means 104 is moved within the focal plane 103, or the Fresnel lens 102 is moved relative to the white light emitting means 104 while keeping the white light emitting means in the focal plane 103, the specific direction of the collimated directed light beam changes. If the white light emitting means 104 is, for example, moved to the left within the focal plane 103, the specific direction of the collimated directed light beam will change to a direction which points to the bottom-left end of FIG. 1.

Figure 2:
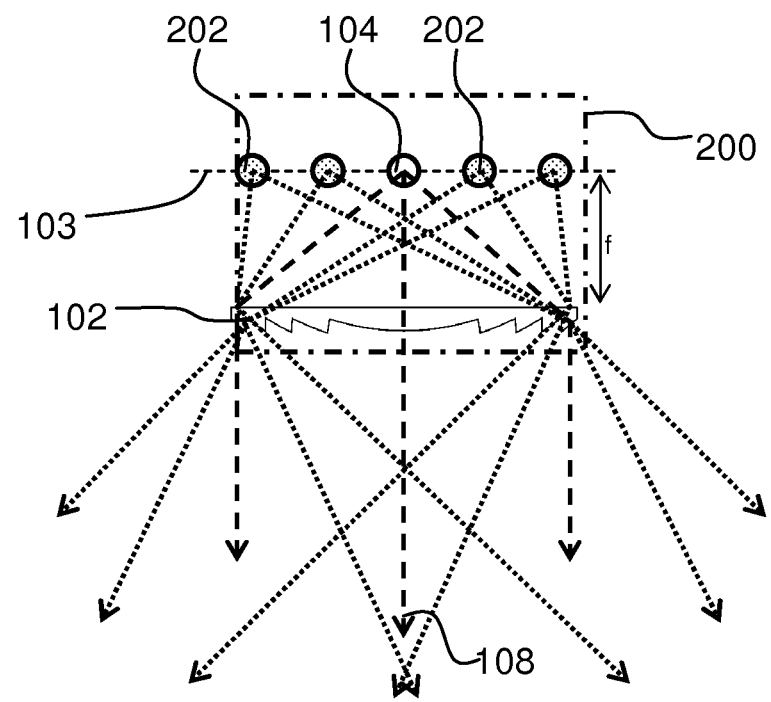

In FIG. 2, another lighting element 200 is schematically presented. Lighting element 200 is similar to lighting element 100 of FIG. 1 with respect to the Fresnel lens 102 and the white light emitting means 104, however, the blue light emitting means comprises a plurality of blue light sources 202 which each emit light towards the Fresnel lens 102. The blue light sources 202 are arranged in the focal plane 103 of the Fresnel lens, but in positions which differ from the position of the white light emitting means 104. The blue light which is emitted by the Fresnel lens 102 comprises a plurality of directed blue light beams which are emitted in a plurality of directions. At least some parts of the directed blue light beams are emitted outside the collimated directed white light beam and thereforesaid other viewer 110 receives blue light from a plurality of directions and this light is consequently perceived by the other viewer 110 as light similar to the portion of blue diffuse light of daylight on a sunny day.

Figure 3:
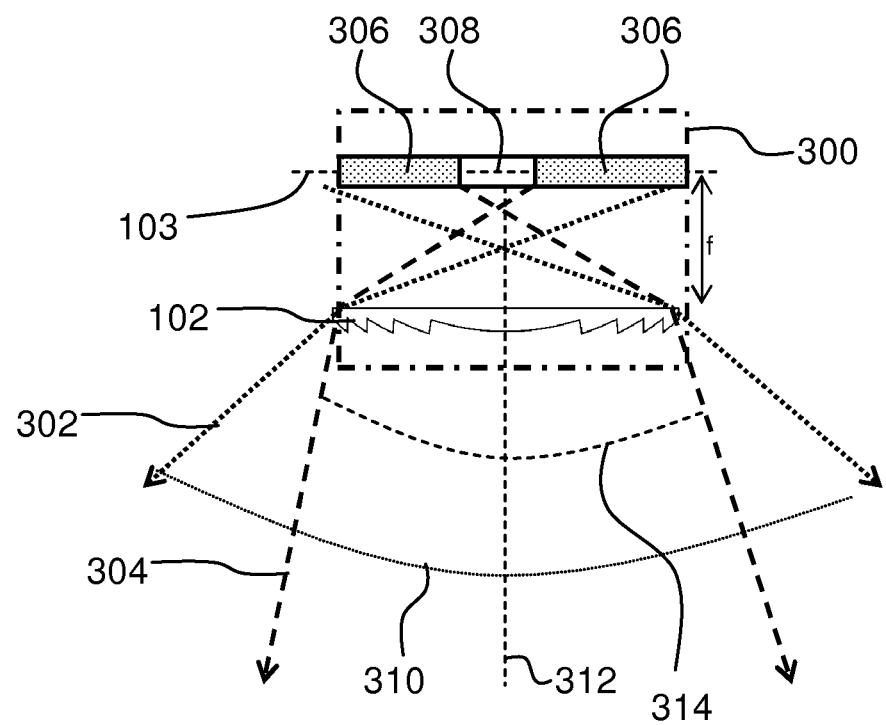

In FIG. 3, another lighting element 300 is presented which is similar to the lighting element 200 of FIG. 2, however, the white light emitting means 308 and the blue light emitting means 306 are not depicted as a point light source anymore, but as light sources having a light emitting surface of a certain size. Consequently, the collimated directed light beam 314 does not only comprise light rays which are parallel to the imaginary central axis 312 of the collimated directed light beam, but also light rays 304 travelling in a light emission direction that includes a small angle with the imaginary central axis 312, the small angle being, for example, smaller than 15°. The blue light emitting means 306 is also a blue light source which has a light emitting surface of a certain size. In FIG. 3, the blue light emitting means is shown in the focal plane 103 of the Fresnel lens. Because the blue light emitting means has a relatively large light emitting surface (compared to the size of a light emitting surface of a point light source), the blue light emission 310 comprises also light rays 302 at relatively large light emission angles with respect to the imaginary central axis 312 of the collimated directed light beam 312. In other embodiments, the blue light emitting means 306 may be arranged outside the focal plane 103. Further, FIG. 3 presents only a cross-section and the drawn rectangles of the blue light emitting means 306 may be a cross-section of the blue light emitting means 306 which comprises two elongated box-shaped light sources, or may be a cross-section of the blue light emitting means 306 which is a disc-shaped light source with a central hole in which the white light emitting means 308 is arranged.

Figure 4:
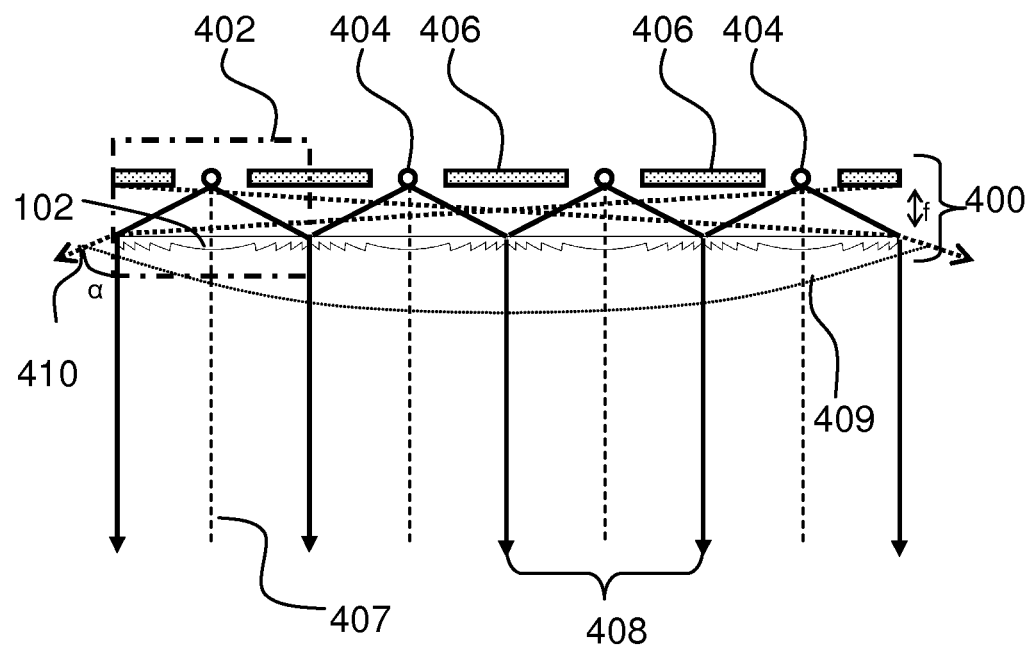

FIG. 4 schematically presents a cross-section of a lighting system 400 which comprises an array of lighting elements 402 according to the first aspect of the invention. Each lighting element 402 comprises a white light emitting means 404 and blue light emitting means 406. The blue light emitting means has a relatively large light emitting surface. Each one of the lighting elements 402 emits a collimated directed light beam 408 and all central axes 407 of the collimated directed light beams 408 are substantially parallel. Consequently, a relatively large collimated directed light beam is obtained. The blue light emission 409 is schematically drawn with dotted lines. One of the outer light rays of the blue light emission 409 is indicated with arrow 410. The outer light ray 410 has a light emission angle α with respect to the central axes 407 of the collimated directed light beams 408. The light emission angle α may be close to 90°, however, the intensity of the blue light emission at this angle may be relatively small.

Figure 5A:
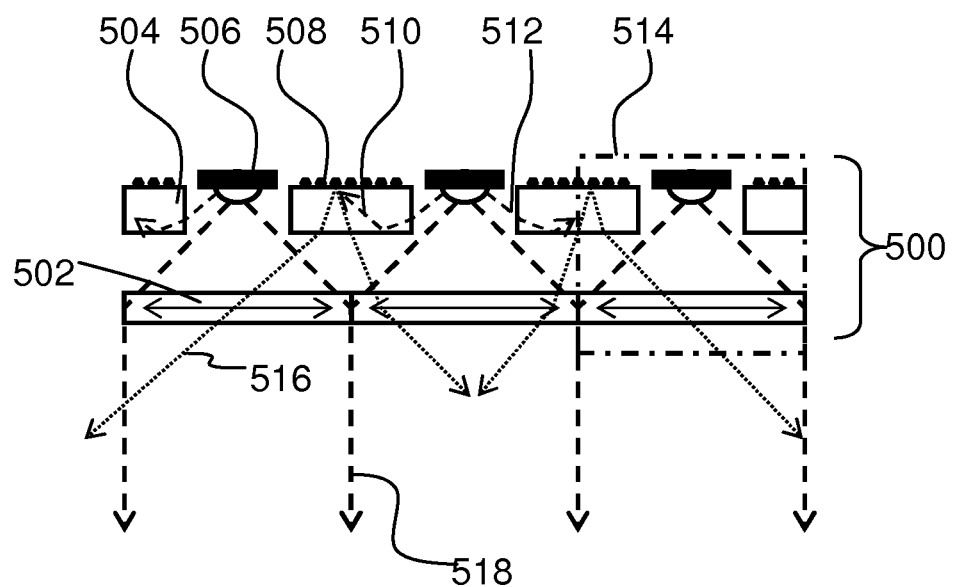

FIG. 5a schematically presents another cross-section of another embodiment of a lighting system 500. The lighting system 500 comprises a plurality of lighting elements 514. Each one of the lighting elements 514 comprises light guiding elements 504, a white light emitting means 506 and a Fresnel lens 502 (the Fresnel lens 502 is schematically presented with a rectangle comprising a two-sided arrow).

Each light guiding element 504 comprises a light input window facing an area in which the white light emitting means 506 emits white light. The light emission of the white light emitting means 506 is directed towards the Fresnel lens 502. However, not all white light is directly emitted towards the closest Fresnel lens 502 this light is captured by the light input window of the light guiding element 504. In FIG. 5, white light ray 512 is an example of a ray of white light that enters the light guiding element 504 via the light input window of the light guiding element 504. Within the light guiding element 504, the light is light guided, which is, for example, shown for the white light ray 510.

Each light guiding element 504 comprises a light output window facing the Fresnel lens 502 and is arranged for emitting (blue) light towards the Fresnel lens 502. Further, each light guiding element 504 comprises blue outcoupling structures 508 to outcouple light that is captured within the light guiding element 504 towards the light output window of the light guiding element 504, and the blue outcoupling structures 508 are light reflective in a blue spectral range such that light in the blue spectral range is outcoupled via the light output window. The blue outcoupling structures 508 are, for example, dots of blue paint provided on the surface of the light guiding elements 504. In another embodiment, the outcoupling structures 508 may be manufactured by creating recesses in the light guiding element 504 and filling the recesses with a blue reflective material.

Consequently, the lighting system 500 emits white light 518 in parallel beams and emits blue light 516 in substantially all directions.

In another embodiment, the outcoupling structures 508 are not specifically reflective in the blue spectral range, but the light guiding element is transmissive in the blue spectral range such that a portion of the light which is captured by the light guiding element 504 outside the blue spectral range is absorbed. Consequently, the light which exits the light guiding element 504 via the light output window is bluish light.

Figure 5B:
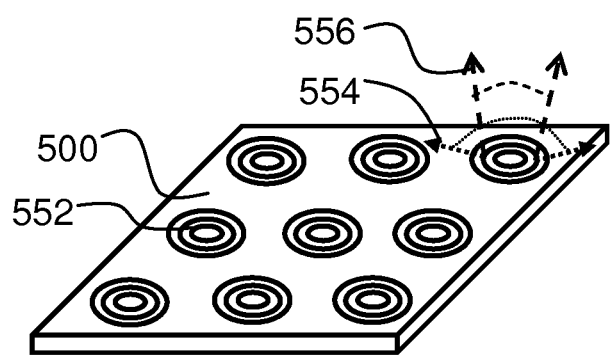

FIG. 5b presents a three-dimensional view of the lighting system of FIG. 5a. The Fresnel lenses 552 are schematically drawn and at one of the Fresnel lenses the collimated directed light beam of white light 556 is presented together with the blue light emission 554 outside the collimated directed light beam.

Figure 6:
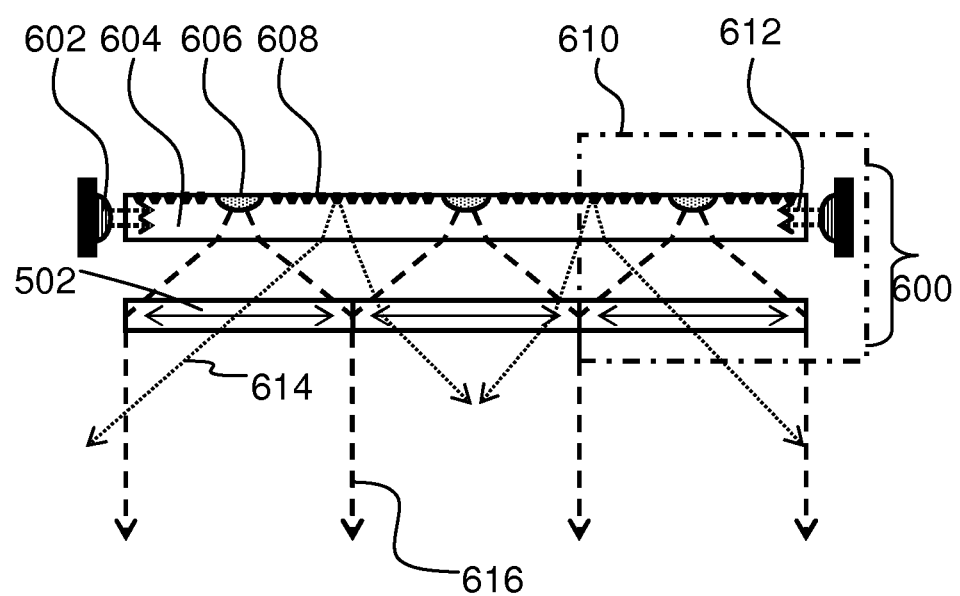

FIG. 6 schematically presents a cross-section of another embodiment of a lighting system 600. The lighting system 600 comprises a plurality of lighting elements 610. Each lighting element 610 comprises a light guide 604. Some of the light guides 604 receive blue light from a blue light source 602 via a light input window. The light guide 604 comprises blue light outcoupling structures 608 which outcouple the blue light guided by the light guide towards a light exit window of the light guide 604 for being emitted towards a Fresnel lens 502. Each lighting element 610 also comprises a luminescent outcoupling structure 606 which comprises light reflective material for outcoupling some blue light, and which comprises a luminescent material for absorbing a portion of the blue light guided by the light guide and converting the absorbed light to light of another spectrum such that the combined light emission of the luminescent outcoupling structure 606 results in light having a spectral distribution such that it is perceived as white light by the human naked eye. In other words, the luminescent outcoupling structures 606 are configured to emit white light. Further, the light guides 604 of the plurality of lighting elements 610 are optically coupled to form a single light guide, seen from an optical point of view. This single light guide receives light from at least one blue light source which is configured to emit blue light.

The blue light outcoupling structures 608 may be dots of white or blue paint provided on a surface of the light guide 604, thus, the blue light outcoupling structures 608 are not by definition blue themselves, but are configured to reflect blue light. In other embodiments, the blue light outcoupling structures 608 are small reflectors provided on the surface of the light guide 604, or a roughened area on the surface of the light guide 604 (for example, obtained by sandblasting the surface or by laser ablation). Alternatively, recesses filled with a reflective or diffusely reflective material may also form the blue light outcoupling structures 608. The luminescent outcoupling structure 606 is, for example, a recess in the light guide 604 which is filled with a mix of the luminescent material and the light reflective material. Alternatively, the luminescent outcoupling structure 606 is provided on the surface of the light guide 604.

It is to be noted that the luminescent outcoupling structures are arranged in an adapted focal plane, which is the focal plane of the Fresnel lens 502 in the light guide 604, after refraction of light at the interface between the light guide 604 and the environment of the light guide 604 is taken into account.

Consequently, as shown in FIG. 6, the lighting system 600 emits white light 616 in a plurality of parallel white light beams, and emits blue light 614 in a plurality of directions.

Figure 7:
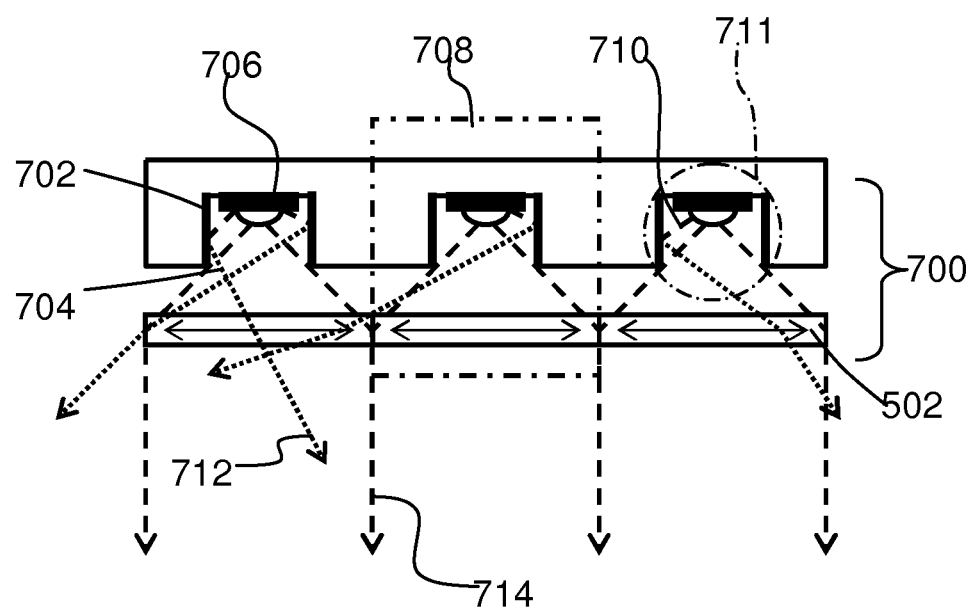

FIG. 7 schematically presents a cross-section of a further embodiment of lighting system 700. The lighting system 700 comprises lighting elements 708 which each comprise a light transmitting channel 711 which has walls 702 which are reflective in a predefined spectral range to obtain a blue light emission. The light transmitting channels 711 receive light from a white light source 706. The light emission of the light transmitting channel 711 is towards a Fresnel lens 502. White light, which is directly emitted through the light transmitting channel 711 and which does not impinge on the walls 702, is collimated by the Fresnel lens 502 to form a collimated directed light beam 714 of white light. White light which impinges on the walls 702 is reflected in the blue spectral range and after refraction by one of the Fresnel lenses 502, the blue light 712 is emitted into the ambient in a plurality of light emission directions. Light ray 710 is a light ray of white light which is emitted by the white light source 706 at a relatively large light emission angle with respect to a central axis of the light transmitting channel 711 and thus impinges on the wall 702 and becomes a blue light ray, such as, for example, indicated with blue light ray 704.

Figure 8:
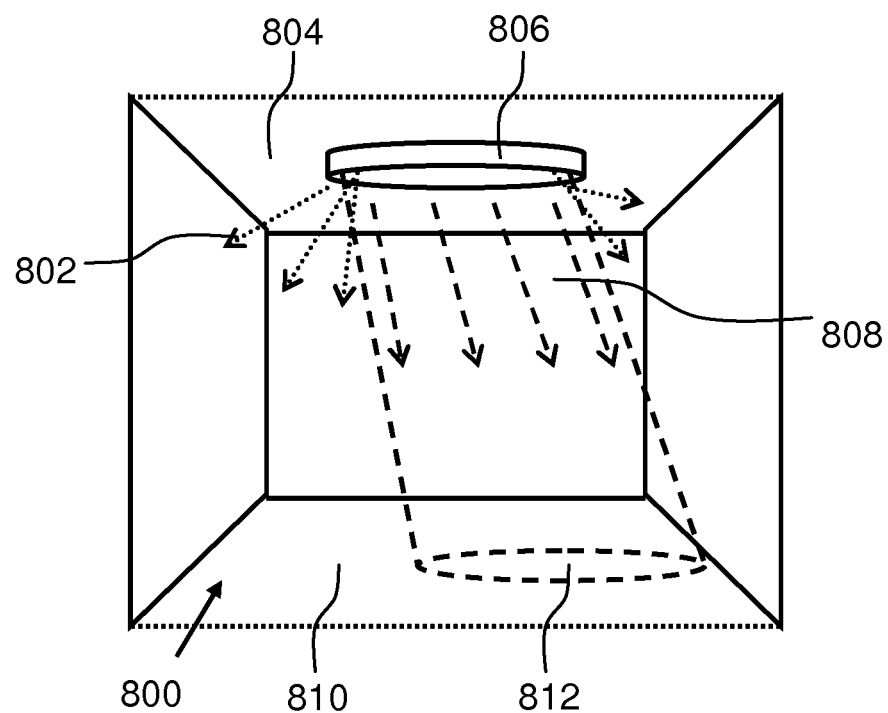

FIG. 8 schematically presents the interior of a room 800. A cylindrical luminaire 806 which comprises a lighting system (not shown) according to the second aspect of the invention is provided at the ceiling 804 of the room 800. Alternatively, the luminaire comprises the lighting element (not shown) according to the first aspect of the invention.

The luminaire 806 emits a collimated directed light beam 808 of white light which has a circular footprint 812 on the floor 810 of the room 800. People present in the room perceive this light emission as sunlight which falls through a skylight. The luminaire 806 further emits blue light 802 at least in a plurality of directions outside the collimated directed light beam 808. Thus, if a person looks towards the luminaire 806 if he is not inside the collimated directed light beam 808, he perceives the luminaire 806 as a blue surface which is comparable to the blue sky on a sunny day.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting element for obtaining a skylight appearance, the lighting element comprising:
   a white light emitting means for emitting white light;
   a blue light emitting means for emitting blue light; and
   a Fresnel lens arranged to receive all the light from the white light emitting means and all the light from the blue light emitting means;
   wherein the white light emitting means is arranged in a first relative position with respect to the Fresnel lens to collimate at least a part of the light emitted by the white light emitting means to obtain a central collimated directed light beam in a specific direction, and wherein the first relative position is configured such that the light emitted by the white light emitter means is emitted close to the focal plane or in the focal plane of the Fresnel lens, and further wherein the specific direction of the central collimated directed light beam is perpendicular to the Fresnel lens;
   wherein the blue light emitting means is arranged in a second relative position with respect to the Fresnel lens to obtain a wide blue light beam emitted at least outside and at least around the circumference of the central collimated directed light beam, and further wherein the blue light emitting means comprises at least one blue light emitter arranged such that the blue light beam is emitted outside the focal plane of the Fresnel lens, and wherein the second relative position is located in a closer proximity to the Fresnel lens than the first relative position.

2. A lighting element according to claim 1, wherein the white light emitting means comprises a light source which emits white light, or the white light emitting means comprises a combination of light reflection material and luminescent material to obtain a light emission having a spectral distribution of white light, the light reflection material being arranged to reflect light of a specific spectral distribution, the luminescent material being configured to absorb a part of the light of the specific spectral distribution and convert the absorbed part to light of another spectral distribution.

3. A lighting element according to claim 1, wherein the blue light emitting means comprises a light source which emits blue light, or the blue light emitting means comprises a light reflective material being reflective in a predefined spectral range to obtain a blue light emission.

4. A lighting element according to claim 1, wherein the blue light emitting means comprises a first light guide comprising a first light input window and a first light output window, the first light input window being arranged in a position for capturing light from the white light emitting means that is not directly emitted towards the Fresnel lens, and the first light guide comprising first outcoupling structures for outcoupling light via the first light output window, the first light output window being arranged to emit outcoupled light towards the Fresnel lens, the first light guide being light transmissive in a predefined spectral range to obtain a blue light emission through the first light output window or the first outcoupling structures being light reflective in a predefined spectral range to obtain the blue light emission through the first light output window.

5. A lighting element according to claim 1, further comprising:
   a blue light source emitting blue light;
   a second light guide comprising a second light input window and a second light output window, the second light input window being arranged to receive light from the blue light source, the second light output window being arranged to emit outcoupled light towards the Fresnel lens, the second light guide comprising a luminescent outcoupling structure for outcoupling white light via the second light output window, the luminescent outcoupling structure comprising a combination of a light reflective material and a luminescent material to obtain a light emission having a spectral distribution of white light, the light reflection material being configured to reflect blue light, the luminescent material being configured to absorb a part of the blue light and to convert a part of the absorbed light towards light of another specific spectral distribution, the second light guide further comprising blue light outcoupling structures being arranged to outcouple the blue light via the second light exit window.

6. A lighting element according to claim 1, comprising:
   a light transmitting channel comprising a wall being light reflective in a predefined spectral range to obtain a blue light emission;
   a white light source for emitting white light, the white light source being arranged in the light transmitting channels;
   wherein the combination of the white light source and the light transmitting channel is arranged to emit a partly collimated white light beam and diffuse blue light emission towards the Fresnel lens.

7. A lighting system comprising a plurality of lighting elements arranged in an array, each of the lighting elements comprising:
   a white light emitting means for emitting white light;
   a blue light emitting means for emitting blue light; and
   a Fresnel lens arranged to receive all the light from the white light emitting means and all the light from the blue light emitting means;
   wherein the white light emitting means is arranged in a first relative position with respect to the Fresnel lens to collimate at least a part of the light emitted by the white light emitting means to obtain a central collimated directed light beam in a specific direction, wherein the specific direction of the central directed collimated light beam of each lighting element is perpendicular to the Fresnel lens, and wherein the first relative position is configured such that the light emitted by the white light emitter means is emitted close to the focal plane or in the focal plane of the Fresnel lens;
   wherein the blue light emitting means is arranged in a second relative position with respect to the Fresnel lens to obtain a wide blue light beam emitted at least outside and at least around the circumference of the central collimated directed light beam, and further wherein the blue light emitting means comprises at least one blue light emitter arranged such that the blue light beam is emitted outside the focal plane of the Fresnel lens, and wherein the second relative position is located in a closer proximity to the Fresnel lens than the first relative position.

8. A luminaire comprising a lighting element, wherein the lighting element comprises:
   a white light emitting means for emitting white light;
   a blue light emitting means for emitting blue light; and
   a Fresnel lens arranged to receive all the light from the white light emitting means and all the light from the blue light emitting means;
   wherein the white light emitting means is arranged in a first relative position with respect to the Fresnel lens to collimate at least a part of the light emitted by the white light emitting means to obtain a central collimated directed light beam in a specific direction perpendicular to the Fresnel lens, and wherein the first relative position is configured such that the light emitted by the white light emitter means is emitted close to the focal plane or in the focal plane of the Fresnel lens;
   wherein the blue light emitting means is arranged in a second relative position with respect to the Fresnel lens to obtain a wide blue light beam emitted at least outside and at least around the circumference of the central collimated directed light beam, and further wherein the blue light emitting means comprises at least one blue light emitter arranged such that the blue light beam is emitted outside the focal plane of the Fresnel lens, and wherein the second relative position is located in a closer proximity to the Fresnel lens than the first relative position.

* * * * *